Patented Mar. 22, 1932

1,850,716

UNITED STATES PATENT OFFICE

HAROLD GRAY, OF AKRON, OHIO, ASSIGNOR TO THE B. F. GOODRICH COMPANY, OF NEW YORK, N. Y., A CORPORATION OF NEW YORK

COMPOSITION OF MATTER AND METHOD OF PRODUCING SAME

No Drawing. Original application filed July 31, 1926, Serial No. 126,341. Divided and this application filed June 21, 1930. Serial No. 462,925.

This invention relates to the vulcanization of rubber and similar materials and has for a primary object to provide a process for the vulcanization of rubber by the aid of accelerators formed by heat treatment of aldehydes with relatively small amounts of organic aliphatic amines, as well as ammonia. A further object is to provide a new class of organic accelerators having a comparatively low nitrogen content which will be relatively free from low temperature curing, as shown by "air curing" or scorching during factory processing of the uncured rubber mixes, but which will cause rapid vulcanization at ordinary vulcanizing temperatures.

It is known that alkalies, such as sodium or potassium hydroxides, will change acetaldehydes to aldol, butyric aldehyde to para-butyl-aldehdye, and in general change aldehydes to higher boiling products. Products such as para-butyl-aldehyde have been proposed as accelerators for the vulcanization of rubber or otherwise described as having a valuable effect on the physical properties of the vulcanizate.

I am also aware that aldehydes are known to react with the well-known aldehyde-amines, produced by the action of one mol of aldehyde on one mol of primary amine, to provide accelerators of vulcanization comprising ultimately the reaction product of three mols of aldehyde on two mols of amine. Such products are formed by preparing first the original aldehyde-amine and then by the aid of heat and the addition of more aldehyde to cause a further reaction.

I now find that when a small amount of an amine, such as aniline, benzylamine, n-butyl-amine, or even ammonia, is added to a liquid aldehyde and the mixture is heated under a reflux condenser for several hours, a large amount of the aldehyde is condensed, polymerized, or otherwise rendered high boiling and, after distillation of unchanged aldehyde, if any, the resulting product is found to correspond to a reaction product of one mol of amine to several mols of aldehyde. Furthermore, it has been observed that these high-boiling liquid products, prepared from a large amount of aldehyde combined with a small amount of amine are not formed by adding a previously prepared aldehyde-amine to a large excess of aldehyde. The original aldehyde-amine condensation product, once formed, apparently does not function the same as the original amine. The exact nature of these products is not known, and they are therefore for convenience referred to herein as "condensation products".

Furthermore, I find that the preparation of these condensation products having a large amount of aldehyde combined with a small amount of amine may be carried out in the presence or in the absence of acids and acidic substances. The presence of a small proportion of acidic substances in the reaction mixture facilitates the condensation reaction and results ordinarily in a condensation product of somewhat higher accelerating value than these condensation products made from aldehydes and amines without the presence of acids. Commercial aldehydes normally contain a small per cent. of free acids, ranging approximately from 0.5 to 3 per cent., and it has been observed that the amount of free acids normally present in commercial aldehydes is generally sufficient to give condensation products of maximum accelerating value. Although a reaction mixture of aldehydes and amine containing from 0.5 to 3 per cent. of acids, based on the aldehyde, is ordinarily preferred for the preparation of these condensation products, it has been found that reaction mixtures containing both lower and higher percentages of acid produce condensation products of high accelerating value.

The relative accelerating value of condensation products of an aldehyde and an amine made in the presence and in the absence of acids is illustrated by the following experiment:

*Example 1.*—One mol of p-amino-dimethylaniline was caused to react with 2 mols of n-butyric aldehyde, (a) in the absence of acids and (b) in the presence of acidic substances having an acid equivalent of 2.8 per cent. butyric acid based on the aldehyde. Each of the two condensation products was compounded into a rubber mix comprising rubber—100, zinc oxide—10, sulfur—5, and condensation product—0.4 parts by weight. All cures were at 286° F. In the results tabulated below, the tensile strengths (T) are given in pounds per square inch, and the elongations (E) in per cent.:

| Condensation product made | Cure in minutes | | | | | |
|---|---|---|---|---|---|---|
| | 15 | | 30 | | 60 | |
| | T | E | T | E | T | E |
| (a) Without acid | 1230 | 950 | 2260 | 860 | 2740 | 775 |
| (b) With acid | 3260 | 881 | 3621 | 775 | 4450 | 750 |

Similar improved accelerating value of the acid condensates of aldehyde-amines over the non-acid condensates was also observed for other molecular proportions of the above aldehyde and amine condensation product, and also for other aldehyde-amine condensation products. The character of the acidic substances employed in the reaction mixture seems to be of no great consequence, although the organic acids have been found to be preferable to the stronger mineral acids.

It is also observed that the condensation products comprising two or more mols of aliphatic aldehyde reacted with one mol of an amine excel in accelerating activity the aldehyde-amines heretofore employed as accelerators for the vulcanization of rubber, as is evidenced by shorter cures and higher tensile strengths of the vulcanizates. Starting with the reaction product of one mol of aldehyde and one mol of amine and increasing the aldehyde in steps of one mol each up to 4, and in some cases up to 8, mols of the aldehyde, and compounding the products weight for weight in a given formula, it is observed that whereas the nitrogen content, or content of original amine, grows proportionately less and less in the reaction product, yet the accelerating effect on the reaction product increases as the ratio of aldehyde to amine increases. This is shown by the two following experiments.

*Example 2.*—One mol of p-amino-dimethylaniline was caused to react respectively with 1, 1.6, 2 and 4 mols of commercial n-butyric aldehyde showing on analysis a free acid content equivalent to 2.8 per cent. of butyric acid. Each of the four products were compounded into a rubber mix comprising rubber—100, zinc oxide—10, sulfur—5, and condensation product—0.4 parts by weight. All cures were at 286° F. In the results tabulated below, the tensile strengths (T) are given in pounds per square inch, and the elongations (E) in per cent.

| Mols aldehyde per mol amine | Cure in minutes | | | | | |
|---|---|---|---|---|---|---|
| | 15 | | 30 | | 60 | |
| | T | E | T | E | T | E |
| 1 | 1370 | 913 | 2510 | 838 | 3520 | 783 |
| 1.6 | 1870 | 881 | 3410 | 831 | 3770 | 733 |
| 2 | 3260 | 881 | 3620 | 775 | 4450 | 750 |
| 4 | 4490 | 788 | 4840 | 725 | 3780 | 683 |

*Example 3.*—One mol of p-amino-dimethylaniline was caused to react respectively with 1, 4, 5 and 8 mols of commercial n-butyric aldehyde as above described. Each of the four products were compounded into a rubber mix comprising rubber—100, zinc oxide—10, sulfur—5, and condensation product—0.5 parts by weight. All cures were 20 minutes at 287° F.

| Mols aldehyde per mol amine | Tensile strength in lbs. per sq. in. | Elongation in per cent. |
|---|---|---|
| 1 | 3420 | 713 |
| 4 | 4330 | 694 |
| 5 | 4450 | 719 |
| 8 | 4670 | 780 |

In preparing products having a high ratio of aldehyde to amine, it is frequently desirable to use an excess of aldehyde during the reaction and to remove the excess of aldehyde by distillation, as by heating the reaction mixture to a temperature somewhat higher than the boiling point of aldehyde employed.

*Example 4.*—As a further example of a method of preparation of these accelerators, 107 g. of commercial n-butyric aldehyde were mixed with 18 g. of n-butylamine. This is substantially in the ratio of 6 mols of aldehyde to 1 mol of amine. A violent reaction took place and the liquid boiled. When the reaction had subsided, the mixture was heated under a reflux condenser for from 1 to 2 hours or until the reflux of unchanged aldehyde had disappeared. The mixture was then allowed to cool and settle. The lower layer of water was removed and the upper layer dried by gentle heating in an open container. One half of one part by weight of the product in the above formula produced a product having a tensile strength of about 4400 pounds per square inch, when cured for 15 minutes at 287° F. in a press.

Other aliphatic amines may be substituted for the n-butylamine of the preceding example, such as methylamine, ethylamine, diethylamine, ethylenediamine and the like. Di-n-butylamine and tri-n-butylamine when employed in the above example exert a similar effect in reaction with a large amount of butyric aldehyde to produce a condensation product, which products, however, do not give to the vulcanizates prepared according to the same formula as high tensile strengths. This lower accelerating action is also observed with other aliphatic aldehydes treated with other secondary or tertiary amines.

*Example 5.*—One mol of aniline was caused to react respectively with 1, 2, 3 and 6 mols of commercial butyric aldehyde, a greater excess of aldehyde being used with the higher ratios and the excess removed by distillation. The relative curing action of the four products was shown by using 0.5 parts by weight in the formula of Example 3 and curing for 29 minutes at 287° F.

| Mols aldehyde per mol amine | Tensile strength in lbs. per sq. in. | Elongation in per cent. |
| --- | --- | --- |
| 1 | 2000 | 940 |
| 2 | 3280 | 806 |
| 3 | 3960 | 794 |
| 6 | 4270 | 725 |

*Example 6.*—One mol (87 parts by weight) of isoamylamine was added to 15 mols (1080 parts) of purified butyric aldehyde and the mixture heated under a reflux condenser on the steam bath for 20 hours, 163 parts by weight of water separated out and was removed. The non-aqueous layer was then distilled up to 150° C. in the liquid whereby 2 parts of water and 12 parts of organic liquid were removed. The residue, weighing 938 parts by weight was found to correspond to the reaction product of 14 mols of butyric aldehyde and 1 mol of isoamylamine. A composition containing this condensation product and comprising rubber—100, zinc oxide—10, sulfur—5 and condensation product—0.5 (parts by weight) showed the following accelerating action in press cures at 287° F.

| Cure in minutes | Tensile strength in lbs. per sq. in. | Elongation in per cent. |
| --- | --- | --- |
| 15 | 2500 | 850 |
| 20 | 2850 | 825 |
| 40 | 3810 | 775 |
| 60 | 3785 | 750 |

Accelerators having higher ratios of aldehyde to amine than that indicated above may be obtained by the process hereinabove described, a reaction product having an aldehyde-amine ratio of 26 mols of aldehyde to 1 mol of amine and possessing satisfactory accelerating powers having been prepared and tested. Numerous tests of the efficacy of these accelerators seems to indicate that the condensation products having a maximum accelerating value have an aldehyde-amine ratio ranging from 4–8 mols of aldehyde to 1 mol of amine, varying with the aldehyde and amine employed, the accelerating value dropping off slowly from a maximum as the aldehyde-amine ratio is further increased.

It is also observed that mixtures of different aliphatic aldehydes react with an organic amine, or ammonia, to form condensation products having desirable accelerating values for certain purposes. The following example is illustrative of such a condensation product:

*Example 7.*—Three mols of commercial butyric aldehyde (1080 parts by weight) was mixed with one mol of commercial aldol (440 parts) and one mol of aniline (465 parts) was added thereto. The product was stirred and then heated under a reflux condenser for about ten hours. The product was allowed to cool and then heated to 140° C. in the liquid, whereby water and some organic liquid was distilled off, the liquid residue comprising the condensation product amounting to approximately 1420 parts by weight. A rubber composition containing this condensation product and comprising rubber—100, zinc oxide—10, sulfur—5, and condensation product—0.5 (parts by weight) show the following accelerating action in press cures at 287° F.

| Cure in minutes | Tensile strength in lbs. per sq. in. | Elongation per cent. |
| --- | --- | --- |
| 30 | 3270 | 750 |
| 60 | 3430 | 700 |
| 90 | 3710 | 688 |

While the specific example above given recite accelerators prepared from butyric aldehyde, it is to be understood that other aldehydes may be employed. Heptaldehyde and iso-butyric aldehyde have been found to produce condensation products having accelerating values substantially equal to these prepared from butyric aldehyde. Cinnamic aldehyde, croton aldehyde, and aldol may also be used in place of butyric aldehyde, although saturated aliphatic aldehydes are preferred. The condensation of amines with low boiling aldehydes may be carried out under pressure, and this procedure may be substituted with respect to other aldehydes in place of the above described treatment under a reflux condenser. Aliphatic amines of the straight or branched chain type as well as aliphatic amines having cyclic groupings are operative in the preparation of the accelerators of this application and the term "aliphatic" is employed in this generic sense in the appended claims.

This application is a division of my co-pending application Serial No. 126,341, filed July 31, 1926, which in turn is a continuation in part of my earlier application Serial No. 66,868, filed November 4, 1925.

I claim:

1. The process of vulcanizing rubber which comprises treating rubber under vulcanizing conditions with vulcanizing agents and a product resulting from a single-stage reaction of aliphatic amine and aliphatic aldehyde in substantially the ratio of one mol of aliphatic amine to two mols of aliphatic aldehyde.

2. The process of vulcanizing rubber which comprises treating rubber under vulcanizing conditions with vulcanizing agents and a product resulting from a single-stage reaction of aliphatic amine and aliphatic aldehyde in substantially the ratio of one mol of aliphatic amine to three mols of aliphatic aldehyde.

3. The process of vulcanizing rubber which comprises treating rubber under vulcanizing conditions with vulcanizing agents and a product resulting from a single-stage reaction of butylamine and butyraldehyde in substantially the ratio of one mol of butylamine to two mols of butyraldehyde.

4. The process of vulcanizing rubber which comprises treating rubber under vulcanizing conditions with vulcanizing agents and a product resulting from a single-stage reaction of butylamine and butyraldehyde in substantially the ratio of one mol of butylamine to three or more mols of butyraldehyde.

5. A composition of matter comprising rubber combined with vulcanizing agents in the presence of a product resulting from a single-stage reaction of aliphatic amine and aliphatic aldehyde in substantially the ratio of one mol of amine to two mols of aliphatic aldehyde.

6. A composition of matter comprising rubber combined with vulcanizing agents in the presence of a product resulting from a single-stage reaction of aliphatic amine and aliphatic aldehyde in substantially the ratio of one mol of amine to three or more mols of aldehyde.

7. A composition of matter comprising rubber combined with vulcanizing agents in the presence of a product resulting from a single-stage reaction of butylamine and butyraldehyde in substantially the ratio of one mol of butylamine to two mols of butyraldehyde.

8. A composition of matter comprising rubber combined with vulcanizing agents in the presence of a product resulting from a single-stage reaction of butylamine and butyraldehyde in substantially the ratio of one mol of butylamine to three or more mols of butyraldehyde.

9. The process of vulcanizing rubber which comprises treating rubber under vulcanizing conditions with vulcanizing agents and a product resulting from a single-stage reaction, in the presence of an acidic substance, of aliphatic amine and aliphatic aldehyde in the ratio of one mol of amine to more than one mol of aldehyde.

10. The process of vulcanizing rubber which comprises treating rubber under vulcanizing conditions with vulcanizing agents and a product resulting from a single-stage reaction, in the presence of an acidic substance, of aliphatic amine and aliphatic aldehyde substantially in the ratio of one mol of amine to three or more mols of aldehyde.

11. The process of vulcanizing rubber which comprises treating rubber under vulcanizing conditions with vulcanizing agents and a product resulting from a single-stage reaction, in the presence of an acidic substance, of butylamine and butyraldehyde in substantially the ratio of one mol of butylamine to three or more mols of butyraldehyde.

12. A composition of matter comprising rubber combined with vulcanizing agents and a product resulting from a single-stage reaction, in the presence of an acidic substance, of aliphatic amine and aliphatic aldehyde in the ratio of one mol of amine to more than one mol of aldehyde.

13. A composition of matter comprising rubber combined with vulcanizing agents and a product resulting from a single-stage reaction, in the presence of an acidic substance, of aliphatic amine and aliphatic aldehyde substantially in the ratio of one mol of amine to three or more mols of aldehyde.

14. A composition of matter comprising rubber combined with vulcanizing agents and a product resulting from a single-stage reaction, in the presence of an acidic substance, of butylamine and butyraldehyde in substantially the ratio of one mol of butylamine to three or more mols of butyraldehyde.

15. A composition of matter comprising an aldehyde-amine condensation product resulting from the single-stage reaction of one mol of aliphatic amine with more than two mols of aliphatic aldehyde.

16. A composition of matter comprising an aldehyde-amine condensation product resulting from the single-stage reaction of one mol of aliphatic amine with not less than three mols of butylaldehyde.

17. A composition of matter comprising the aldehyde-amine condensation product resulting from the single-stage reaction of one mol of butylamine with not less than three mols of butylaldehyde.

18. A composition of matter comprising the aldehyde-amine condensation product resulting from the single-stage reaction, in the presence of an acidic substance, of one mol of aliphatic amine with more than two mols of aliphatic aldehyde.

19. A composition of matter comprising the aldehyde-amine condensation product resulting from the single-stage reaction, in the presence of acidic substance, of one mol of aliphatic amine with not less than three mols of aliphatic aldehyde.

20. A composition of matter comprising the aldehyde-amine condensation product resulting from the single-stage reaction, in the presence of acidic substance, of one mol of aliphatic amine and three or more mols of butyric aldehyde.

21. The method of making aldehyde-amine condensation products which comprises reacting in a single stage one mol of aliphatic amine with more than two mols of aliphatic aldehyde.

22. The method of making aldehyde-amine condensation products which comprises reacting in a single stage one mol of aliphatic amine with at least three mols of aliphatic aldehyde.

23. The method of making aldehyde-amine condensation products which comprises reacting in a single stage one mol of aliphatic amine with more than two mols of aliphatic aldehyde, and thereafter removing in substantial part the water formed during the reaction.

24. The method of making aldehyde-amine condensation products which comprises reacting in a single stage one mol of aliphatic amine with at least three mols of aliphatic aldehyde, and thereafter removing in substantial part the water formed during the reaction.

25. The method of making aldehyde-amine condensation products which comprises reacting in a single stage one mol of aliphatic amine with at least three mols of aliphatic aldehyde, and thereafter distilling off in substantial part any aldehyde which is unreacted with the amine.

26. The method of making aldehyde-amine condensation products which comprises reacting in a single stage in the presence of acidic substance one mol of aliphatic amine with more than two mols of aliphatic aldehyde.

27. The method of making aldehyde-amine condensation products which comprises reacting in a single stage in the presence of acidic substance one mol of aliphatic amine with at least three mols of aliphatic aldehyde.

28. The method of making aldehyde-amine condensation products which comprises reacting in a single stage in the presence of acidic substance one mol of aliphatic amine with more than two mols of aliphatic aldehyde, and thereafter removing in substantial part the water formed during the reaction.

29. The method of making aldehyde-amine condensation products which comprises reacting in a single stage in the presence of acidic substance one mol of aliphatic amine with at least three mols of aliphatic aldehyde, and thereafter removing in substantial part the water formed during the reaction.

30. The method of making aldehyde-amine condensation products which comprises reacting in a single stage in the presence of acidic substance one mol of aliphatic amine with at least three mols of aliphatic aldehyde, and thereafter distilling off in substantial part any aldehyde which is unreacted with the amine.

In witness whereof I have hereunto set my hand this 19th day of June, 1930.

HAROLD GRAY.